United States Patent [19]

Sinocchi

[11] Patent Number: 4,708,261

[45] Date of Patent: Nov. 24, 1987

[54] PACKAGING CLIP DISPENSER

[76] Inventor: Michael Sinocchi, 4 Van Gogh La., Suffern, N.Y. 10901

[21] Appl. No.: 820,335

[22] Filed: Jan. 21, 1986

[51] Int. Cl.⁴ .............................................. B65G 59/06
[52] U.S. Cl. .................................... 221/289; 221/307; 221/308; 29/789; 29/814; 53/138 A
[58] Field of Search ............... 221/307, 308, 151, 152, 221/281, 294, 289, 312 B, 310; 29/235, 773, 789, 809, 814, 816, 818; 53/138 A, 138 R, 305, 340, 417

[56] References Cited

U.S. PATENT DOCUMENTS

| | | |
|---|---|---|
| 199,888 | 1/1878 | Wolf . |
| 525,581 | 9/1894 | Blakey . |
| 1,010,320 | 11/1911 | Ruehs ................................. 221/310 |
| 1,878,354 | 9/1932 | Wessman ............................ 221/310 |
| 1,890,388 | 12/1932 | Kramlik .............................. 221/310 |
| 2,350,192 | 5/1944 | Redman ................................ 226/80 |
| 2,407,409 | 9/1946 | Farries ................................ 221/279 |
| 2,481,495 | 9/1949 | Borthwick ......................... 221/310 |
| 2,592,346 | 4/1952 | Scogin ................................ 221/289 |
| 2,972,747 | 2/1961 | Keler .................................... 29/818 |
| 3,021,654 | 2/1962 | Harris .................................. 53/138 |
| 3,061,983 | 11/1962 | Irwin ..................................... 53/14 |
| 3,115,735 | 12/1963 | Tipper ................................. 53/124 |
| 3,810,292 | 5/1974 | Whales ............................ 29/243.57 |
| 3,824,671 | 7/1974 | Watkins ............................... 29/789 |
| 4,071,949 | 2/1978 | Ross et al. ......................... 221/289 |
| 4,168,928 | 9/1979 | Hentzen ............................. 414/131 |
| 4,381,599 | 5/1983 | Duester et al. ...................... 29/717 |
| 4,428,176 | 1/1984 | Burrell ............................. 53/138 A |
| 4,563,856 | 1/1986 | Kusters ............................... 53/417 |

FOREIGN PATENT DOCUMENTS

| | | | |
|---|---|---|---|
| 853896 | 10/1952 | Fed. Rep. of Germany ...... 221/289 |
| 6756/70 | 12/1966 | Japan ................................... 29/818 |

Primary Examiner—H. Grant Skaggs

[57] ABSTRACT

A clip dispenser for dispensing resilient, generally U-shaped plastic clips. The clips are useful in holding closed the folded over ends of a paperboard container for a foodstuff, such as a portable liquid. The dispenser is in the general form of a vertically disposed rack having a horizontal lower portion, the horizontal lower portion being twisted at about 35° with respect to the horizontal. In use, a foodstuff container having a folded over and generally top portion is inserted upwardly into the endmost part of the horizontal portion to receive a clip. The container is then withdrawn, the clip pushed down upon the horizontal portions of the container, thereby concealing the container. The dispenser includes a reciprocating blocking gate for use when the rack is loaded with a new supply of clips. The end of the horizontal portion carries a recess through which the clips are dispensed, the recessed provided with a plurality of spring-urged detents which serve to maintain the clips in place.

5 Claims, 7 Drawing Figures

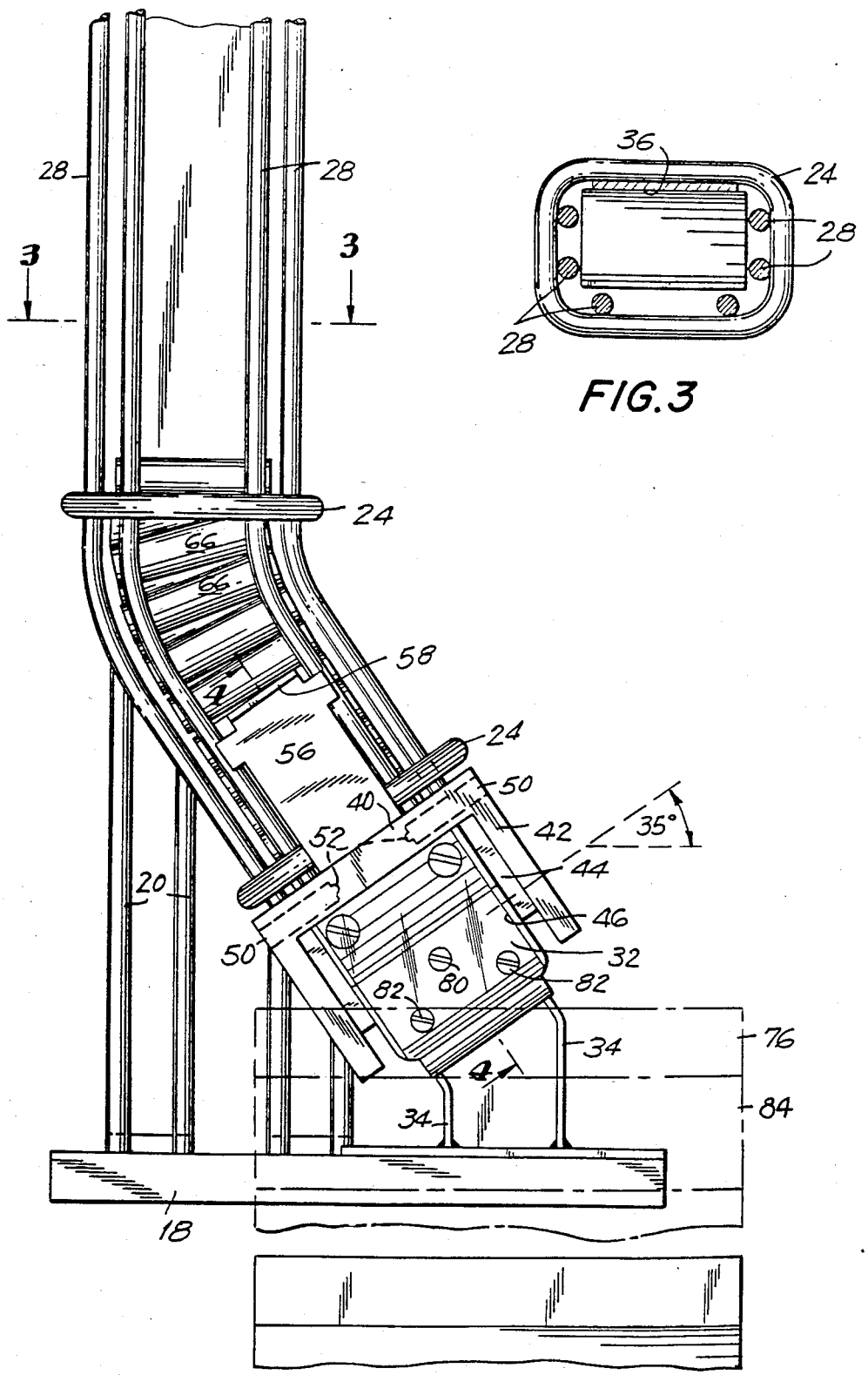

PACKAGING CLIP DISPENSER

BACKGROUND OF THE INVENTION

This invention relates to a clip dispenser for containers, the dispenser being of the type defined by an elongated rack having at its lower end a clip dispensing opening to thereby dispense a single resilient, U-shaped clip at a time. The dispenser exhibits utility in the packaging of foodstuff containers, such as a paperboard carton containing a potable liquid, with the dispenser serving to affix a clip to the folded over top edges of the container to maintain the container closed.

The prior art is aware of clip dispensers of the general form or type as that of the present invention, but are designed and function to dispense clips of a different shape. Further, none is designed to dispense clips for holding together the folded over edges over of a paperboard carton.

SUMMARY OF THE INVENTION

According to the practice of this invention, a clip dispenser is formed in the general shape of an elongated rack having vertical and horizontal portions, with the endmost or terminal end of the horizontal portion being provided with an opening for the dispensing of a single clip at a time. A paperboard container filled with a potable liquid or other foodstuff carries a horizontally disposed edge defined by folded over, lapped layers of the container top. This upper, horizontal edge is inserted upwardly into the clip dispensing opening of the apparatus, the sides of the container top engaging tangs of the clip, the container being then withdrawn to thereby pull a single clip from the dispenser. The clip is then pushed completely down into its horizontal position on the container top. The apparatus is provided with a reciprocating gate to assist in loading new charges or loads of clips as they become exhausted. The endmost or terminal clip in the rack is contacted by a plurality of spring detent members for the purpose of holding it in place, over the dispensing opening, until the container is pushed up into the dispensing opening to receive it.

BRIEF DESCRIPTION OF THE DRAWINGS

FIG. 2 is a end view of the lower part of the dispenser looking from right to left of FIG. 1.

FIG. 3 is a cross section taken along section 3—3 of FIG. 2.

DETAILED DESCRIPTION OF THE INVENTION

Figure 1:
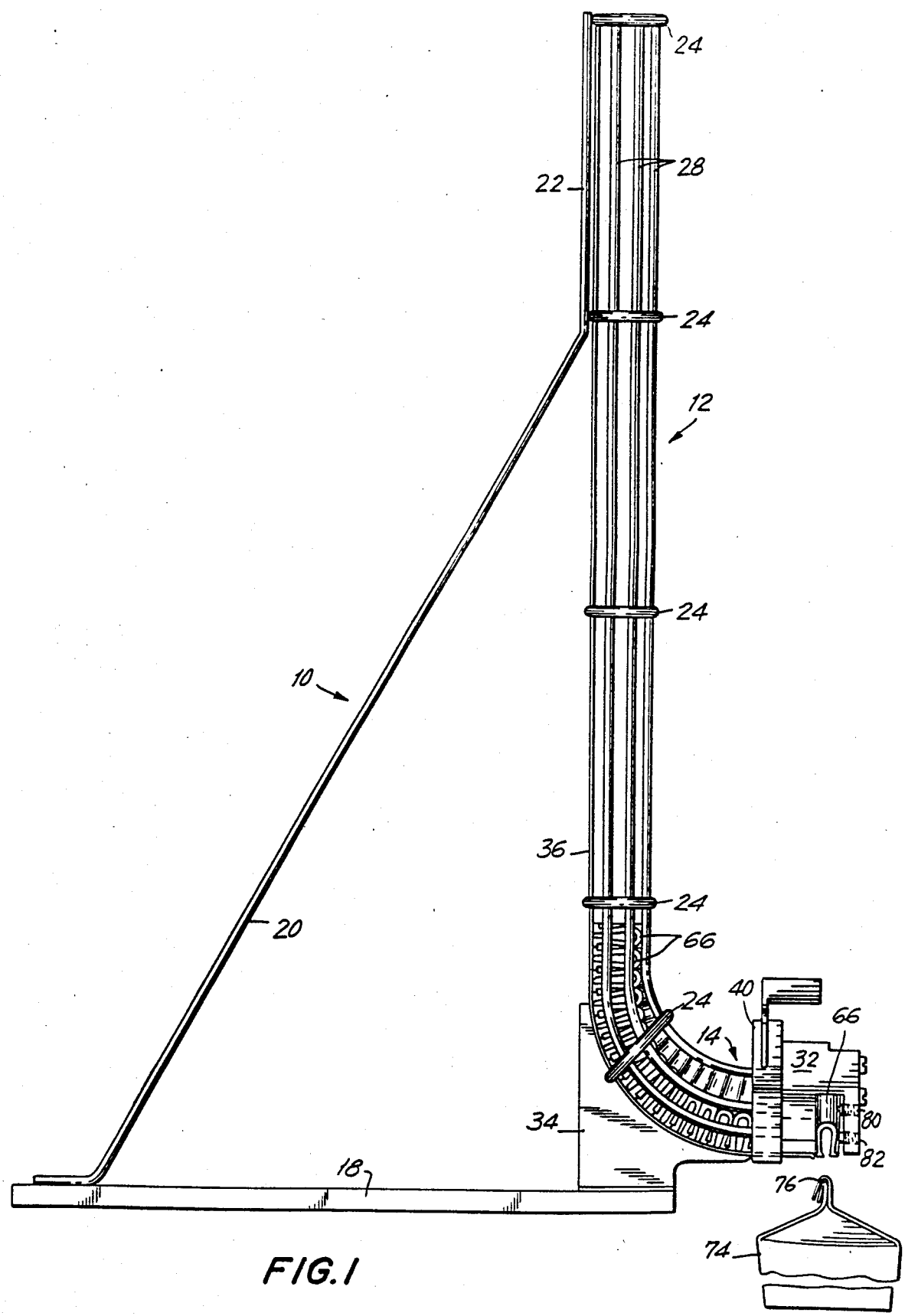
FIG. 1 is a side elevational view of the clip dispensing apparatus of this invention and the upper portion of a paperboard container to be clipped and closed.
Figure 4:
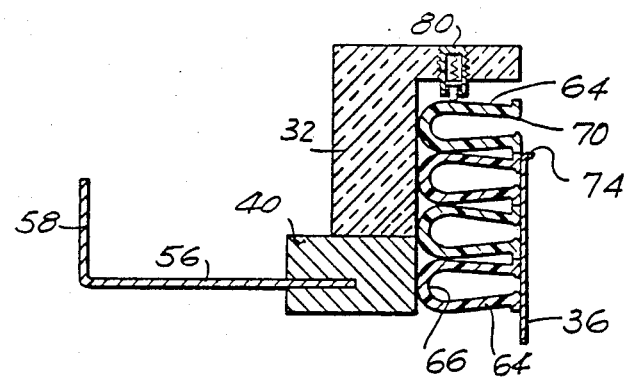
FIG. 4 is a view taken along line 4—4 of FIG. 2.

Referring now to FIGS. 1 to 3 of the drawings, the numeral 10 denotes generally the clip dispensing apparatus of this invention and includes a generally vertical rack portion 12 having a horizontal portion 14 at its lower end, with the end of portion 14 being twisted approximately 35° with respect to the horizontal. As shown at FIG. 1, the portion of the rack between its vertical and horizontal portions is in the form of a smooth curved portion. The numeral 18 denotes a base, conveniently formed of sheet metal or other rigid material while the numeral 20 denotes any one of a plurality of generally upwardly extending and slanted wire bar members each which has an upper vertical portion 22. The numeral 24 denotes any one of a plurality of annular members, also preferably formed of metallic wire bar material, with the uppermost ring members 24 secured, as by welding, to bars 22. The numeral 28 denotes any one of a plurality of generally vertically extending wire bar elements, secured as by welding to the internal portions, at angularly spaced regions thereof, of ring members 24. The numeral 32 denotes a block element of metal or acrylic plastic to which the lowermost ends of bar members 28 are secured. Sheet metal numbers 34, secured as by welding to metallic sheet member 36, are provided at the top portions with welds to support block 32. As indicated at FIG. 2, member 36 is secured to and rests upon base 18. An elongated strip member 36, preferably of sheet metal, extends the entire length of the rack, the rack defined by bars 28 and strip 36 supported within ring members 24, as indicated in FIG. 3. Yoke member 40 includes a pair of legs 42 each carrying guide members 44 which fit into complementary slots 46 on opposite edges of block member 32. Opposite portions of yoke member 40 carry detent members 50 each having a spring-urged detent ball 52. Sheet metal member 56, which functions as a reciprocating gate, it provided with slots on its edges opposite which are complimentary to ball detent elements 52. In the open position of the gate, as illustrated in FIGS. 2 and 4 (the latter to be described presently) the reciprocating gate 56 is in its open position. When reloading of the dispenser is desired, the gate is pushed downwardly, against the biasing force of ball 52, into the path of the clips. Gate 56 is provided its upper end with an angled portion 58 to facilitate manual grasping of the gate for its actuation.

The resilient preferably plastic, clips are defined by leg or wall portions 64 joined by an upper bight portion 66 with the innermost tips of leg portions 64 provided with horizontally extending protuberances or tangs 70 which face each other. As shown at FIGS. 1, 2 and 4, the forwardmost or endmost clip is resiliently urged to the right by the force of the weight (not illustrated) placed on the uppermost end of the stack of clips in the rack and is urged to the left by means of spring-urged detents 80 and 82. Detent 80 bears against an uppermost portion of righthand wall 64 of the endmost clip, while the two lower detents 82 (see FIGS. 1 and 2) bear against a vertically lower portion of leg 64. Detents 80 and 82 are conventional and are defined by tubular members which contain a spring, the spring urging a rounded pintle element outwardly, with the detent element being externally threaded for insertion into block 32. Thus, the endmost or forwardmost clip (see FIG. 4) in the rack is suspended and supported over clip dispensing opening 74 by friction.

Referring briefly to FIG. 2, the reader will note the twist of the lower portion 14 and particularly of block 32 about its horizontal axis (an axis normal to the plane of the drawing) by approximately 35°.

Figure 5:
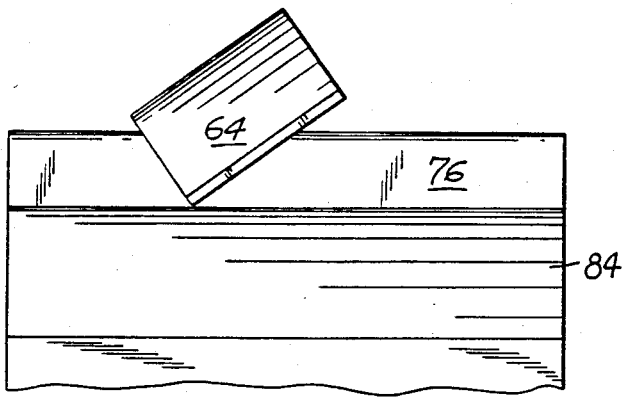
FIG. 5 is a view showing a typical paperboard container having a substantially horizontal folded over and lapped top being provided with a clip just after the container has been inserted and withdrawn from the dispensing apparatus.
Figure 6:
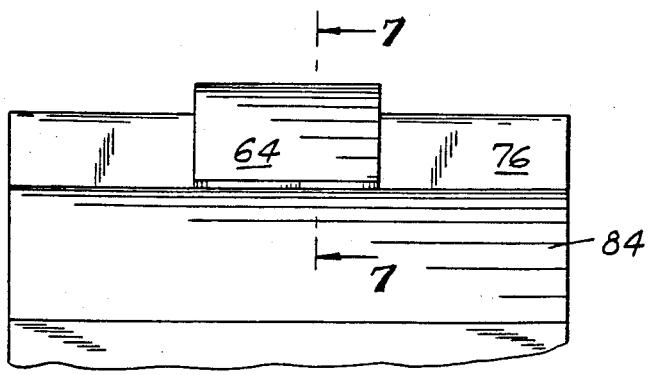
FIG. 6 is a view similar to FIG. 5 illustrating the completed clip and container top assembly after the clip of FIG. 5 has been pushed down.
Figure 7:
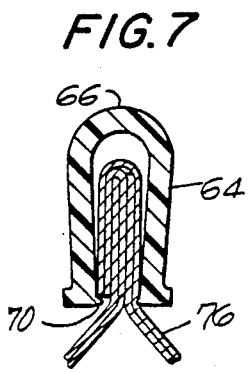
FIG. 7 is a view taken along section 7—7 of FIG. 6.

The mode of operation of the apparatus above described is as follows. A typical paperboard container having a slanted or gable type top, shown in phantom lines at FIG. 2 and in solid lines at FIGS. 1 and 5-7 is placed so that its lapped upper portion 76, defined by overlapping layers of the paperboard, is pushed vertically upwardly. Because of the slant of the dispensing end of the apparatus, the lapped portions 76 make an angle of about 35° (the slant angle shown at FIG. 2) with the longitudinal axis of the clips, as shown at FIG. 5. The carton 84 is pushed all the way up until the innermost surface of clip bight portions 66 is reached by the uppermost portion of lapped portion 76, and the carton then slid to the left and downwardly. When removed from the dispenser, the clip is carried by the carton as indicated in FIG. 5. Thereafter, the clip is pushed down to its horizontally position, so that one of its tangs 70 becomes engaged underneath the lower edge of the outermost lapped carton portion, as may be seen by reference to both FIGS. 1 and 7. The container is now sealed. Access to the container may be obtained by either removing the clip and opening the container or by providing the container with an opening spout or the like, as is conventional in the container art.

The exact mode of dispensing the endmost clip from the rack is as follows. When the clips are in the rack, as indicated in the drawings, the endmost clip is sandwiched between the three detents 80, 82 and its next adjacent clip. The clip is thus held against falling, as previously explained. When container 84 is pushed upwardly, so that lapped portion 76 of the container passes between the legs 64 of the endmost clip, the upper detent plunger 80 prevents the clip from being angled towards the right. The force of the clips feeding into the dispenser, from the weight on top of the clips in the rack, prevents the endmost clip from being angled to the left. Thus the endmost clip is stabilized at the moment of insertion of the lapped container portion 76. For withdrawal, the tang 70 is not yet engaged underneath the edge of the outermost lapped layer of the paperboard carton 84, but the friction between the uppermost portion of the container portion 76 and the lowermost portion of the legs 64 of the endmost clip is sufficient to insure that when the container is moved downwardly and slightly to the left (see FIG. 2) the endmost clip will come out of the dispenser as indicated in FIG. 5.

The clip is initially placed on the lapped ridge 76 as indicated at FIG. 5. If the dispensing of each individual clip was attempted without the twist of block 32, the force required to insert the top of the carton 84 into the bight portion of the endmost clip would be greater than desired. Thus, by angling the block 32, the required upward force on the carton is relatively small, thus eliminating the possibility of damaging the lapped portion 76 of the container. In pushing down the clip from FIG. 5 to FIG. 6, a part of the force is horizontal.

What is claimed is:

1. A clip dispenser for holding and dispensing generally U-shaped resilient clips, and in combination with said clips, each clip having two legs joined by a bight portion, the end of each leg having a tang which faces the other leg, the dispenser including a vertically disposed, elongated rack of annular transverse interior cross-section, the rack holding a stack of U-shaped clips in side-to-side relation, the lower end of the rack terminating in a generally horizontal portion, the portion of the rack between the vertical and horizontal portions being in the form of a smooth curve, a downwardly opening dispensing recess at the terminal end of said horizontal rack portion, the recess being of a size to dispense a single clip at a time, at least one spring-urged detent member at the extreme, forwardmost end of said horizontal rack portion, said detent member being spring urged in a direction toward the opposite end of said horizontal rack portion and abutting one wall of the forwardmost clip, the forwardmost clip being held in its position by friction between the next adjacent clip and by said spring-urged detent, whereby a closed container having a gable type top can be inserted into the forwardmost clip and be withdrawn with the forwardmost clip on the container.

2. The dispenser of claim 1 wherein the horizontal rack portion is twisted about its longitudinal axis by an angle less than 90°, whereby a horizontally disposed container having a top lap fold will receive a slanted clip when its top fold is inserted in the endmost clip of the rack.

3. The dispenser of claim 1 wherein there are at least two of said spring-urged detents, one being mounted higher than the other and engaging vertically spaced apart portions of the forwardmost clip in the rack.

4. The dispenser of claim 1 wherein the legs of each clip slant towards each other for the bight portion of the clip.

5. The dispenser of claim 1 including a reciprocating blocking gate in the said horizontal rack portion, the gate being open in normal clip dispensing operation and being closed when a new supply of clips is inserted into the rack.

* * * * *